United States Patent
Seo

(10) Patent No.: US 9,987,559 B2
(45) Date of Patent: Jun. 5, 2018

(54) AGGREGATING AND UTILIZING META-GAME DATA FOR ARTIFICIAL INTELLIGENCE IN VIDEO GAMES

(71) Applicant: International Business Machines Corporation, Armonk, NY (US)

(72) Inventor: Hyun K. Seo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/167,211

(22) Filed: May 27, 2016

(65) Prior Publication Data

US 2017/0340972 A1 Nov. 30, 2017

(51) Int. Cl.
*A63F 13/67* (2014.01)
*A63F 13/5375* (2014.01)
*A63F 13/87* (2014.01)

(52) U.S. Cl.
CPC .......... *A63F 13/67* (2014.09); *A63F 13/5375* (2014.09); *A63F 13/87* (2014.09)

(58) Field of Classification Search
CPC ....... A63F 13/67; A63F 13/5375; A63F 13/87
See application file for complete search history.

(56) References Cited

U.S. PATENT DOCUMENTS

| | | | |
|---|---|---|---|
| 8,280,826 B2 | 10/2012 | Putzolu et al. | |
| 8,425,326 B2 | 4/2013 | Chudley et al. | |
| 8,515,253 B2 | 8/2013 | Cottrell | |
| 8,665,277 B1 | 3/2014 | Dykes | |
| 8,814,701 B2 | 8/2014 | Vogel et al. | |
| 9,056,252 B2 | 6/2015 | Shah | |

FOREIGN PATENT DOCUMENTS

| | | |
|---|---|---|
| EP | 2495021 | 5/2012 |
| WO | 2007134115 | 11/2007 |

OTHER PUBLICATIONS

Drivatar FAQ, Dec. 25, 2015, Microsoft Research <<available at https://web.archive.org/web/20151225173339/http://research.microsoft.com:80/en-us/projects/drivatar/faq.aspx>>.*

(Continued)

*Primary Examiner* — Werner Garner
(74) *Attorney, Agent, or Firm* — Jeffrey S. La Baw; Jack V. Musgrove

(57) ABSTRACT

Control of artificial intelligence (AI) entities in a video game is enhanced using a meta-game template which reflects successful human player styles, strategies and tactics. Multiple game histories having game environment data and meta-game data relating to human behavior are analyzed, and specific meta-game data is statistically correlated with successful play. Meta-game data can include player chat, which is used to establish a context using natural language processing. Meta-game data can also include team associations, location information relating to a player, and item utilization by a player. Meta-game data can be associated with a particular time period of the game. A meta-game template is applied in a subsequent game by identifying a current context, matching the current context to the context associated with a template, and controlling an AI entity in accordance with the template. After conclusion of the game, the computer system presents meta-game statistics to a user.

14 Claims, 7 Drawing Sheets

(56) References Cited

OTHER PUBLICATIONS

Drivatar in Forza Motorsport, May 7, 2016, Microsoft Research <<available at https://web.archive.org/web/20160507011959/http://research.microsoft.com/en-us/projects/drivatar/forza.aspx>>.*

Drivatar—Forza Motorsport 5 Wiki Guide, Dec. 16, 2013, IGN <<available at http://www.ign.com/wikis/forza-5/Drivatar>>.*

Google Research Blog, "From Pixels to Actions: Human-level control through Deep Reinforcement Learning" [online], retrieved on May 20, 2016 from the Internet URL: http://googleresearch.blogspot.com/2015/02/from-pixels-to-actions-human-level.html (Feb. 2015).

Weber, Ben, et al., "Building Human-Level AI for Real-Time Strategy Games", Proc. AAAI Fall Symposium on Advances in Cognitive Systems (2011).

* cited by examiner

AGGREGATING AND UTILIZING META-GAME DATA FOR ARTIFICIAL INTELLIGENCE IN VIDEO GAMES

BACKGROUND OF THE INVENTION

Field of the Invention

The present invention generally relates to computer systems and artificial intelligence, and more particularly to a method of improving human-like behavior of an artificial intelligence entity in a video game.

Description of the Related Art

Video games have become a multi-billion dollar industry and are quickly moving to the forefront of interactive entertainment. Video games (also referred to as electronic gaming) can be played on a wide range of platforms with various operating systems, primarily computers (desktop, laptop, or tablet) and consoles (e.g., attached to televisions), but also mobile devices such as cellphones. Video games can be designed for solo play or for multiplayer interaction. In the latter case, human players can play against each other, or can form a team to play against "the computer", i.e., a non-human character or other entity whose actions are controlled by the underlying computing device. A game can also have multiple human teams in competition with each other while additionally having computer-generated foes.

There are several different categories of video games that have become popular, including first-person shooter games, real-time strategy games, and role-playing games. First-person shooter games, as the name suggests, generally provide a visual image designed to mimic what a person would directly see within the virtual reality of the game, as that player's presence in the game (i.e., avatar) moves and interacts with the game environment. These games typically focus on the use of hand-held weapons or other equipment, e.g., a player equips a pistol via the game interface and then uses clicks of a mouse or other graphical pointing device to fire the pistol while aiming at various targets on the display screen. One example of a popular first-person shooter game is "Call of Duty". Real-time strategy games allow a single player to control multiple characters, e.g., military units such as marines, tanks, and jets, to form an army. These games typically use a third-person or camera view, i.e., an overhead perspective, allowing the player to view a wide expanse of a battlefield. One example of a popular real-time strategy game is "StarCraft". Role-playing games, as the name again suggests, generally involve a genre such as sword/sorcery or sci-fi which allows the player to assume a particular role, e.g., a wizard or a Jedi knight. Some of these games can accommodate hundreds or thousands of players within the same game environment, and are known as massively-multiplayer online role-playing games (MMORPGs). One example of a popular MMORPG is "EverQuest."

Many of these games have sophisticated techniques to provide artificial intelligence (AI) to the computer-generated characters/units. As seen in FIG. 1, a typical game experience 10 includes a game environment 12, one or more human players 14, and one or more AI players 16. Game environment 12 can be relatively simple, or very complex. The primary game environment parameter is the particular map or maps provided, i.e., a physical setting. Players might be able to travel between multiple areas or zones each having a different map. Maps can have a variety of features such as terrain, locations (regions/waypoints), fog of war, neutral units (critters), interactive items (equipment or powerups), resources, buildings, etc. Triggers can be programmed for the specific map, i.e., when a particular condition occurs then the computer can create certain circumstances or initiate certain actions including AI player actions. Different game types may be available, such as free-for-all, capture-the-flag, deathmatch, high score, control area, etc. Games often have difficulty settings as well, such as easy, normal, hard, or very hard (insane). Other parameters not shown in FIG. 1 can also be provided, such as game speed.

A human player (player character) 14 can engage the game environment in various manners dictated by the hardware and software interfaces. For computer games, human player can use a mouse (graphical pointing device) and keyboard; for console games, a custom controller is usually provided with a joystick and multiple function keys; for cellphone games, the touch screen provides the interface. The human player may possess certain attributes, such as race or class, proficiencies and skills, equipped items and items which can be used without equipping. The human player also brings unique behaviors to the game in the form of styles, strategies, and tactics. Many gamers utilize voice communications to discuss these matters, particularly in match or tournament play. The voice communications can be provided within the game, i.e., as part of the game programming, or can be provided by third party vendors such as Ventrilo or TeamSpeak.

An AI player (non-player character) 16 is controlled via preprogrammed scripts or macros, which are basically different sets of commands that the AI player can follow. Conventional AI is mostly reactionary. An AI player can recognize and attack enemy players, gather resources, manipulate objects such as opening a door or defusing a bomb planted by an enemy, and move around the map such as by using designated waypoints to check for the presence of enemies. AI players can communicate only in a very limited form, using in-game pre-recorded chat such as radio commands.

When a game is over, win or lose, statistics may be provided to the players. The statistics may for example include the number of kills for a player (or team), number of deaths, accuracy, number of goals achieved, number of technologies acquired, number of buildings razed, etc. Some games also allow the player to save the game in the form of a replay file 18. Replay file 18 reflects general player behavior such as movement and equipment usage but does not contain any specific strategies, etc.

SUMMARY OF THE INVENTION

The present invention in at least one embodiment is generally directed to a computer-implemented method of developing an automated play strategy for an electronic game by receiving a plurality of game histories for previously played games wherein each game history includes game environment data and meta-game data relating to behavior of one or more human players, analyzing the game histories to associate specific meta-game data with successful play, and creating a meta-game template for automated play based on the specific meta-game data. The analysis can include filtering the game histories according to success and determining that the specific meta-game data is statistically correlated with successful games. The analysis can also include extracting game chat from at least one of the human players and establishing a context based on the game chat using natural language processing. In an exemplary implementation the meta-game data includes team associations, location information relating to at least one of the human players, game chat, and item utilization by at least one of the human players. The specific meta-game data can be associated with a particular time period of the electronic game. A meta-game template can be applied in a subsequent game, by identifying a current context of the subsequent game, matching the current context to the context associated with the specific meta-game data, and controlling an artificial intelligence entity within the subsequent game in accordance with the meta-game template. After conclusion of the subsequent game, the computer system can present meta-game statistics to a user.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

Figure 1:
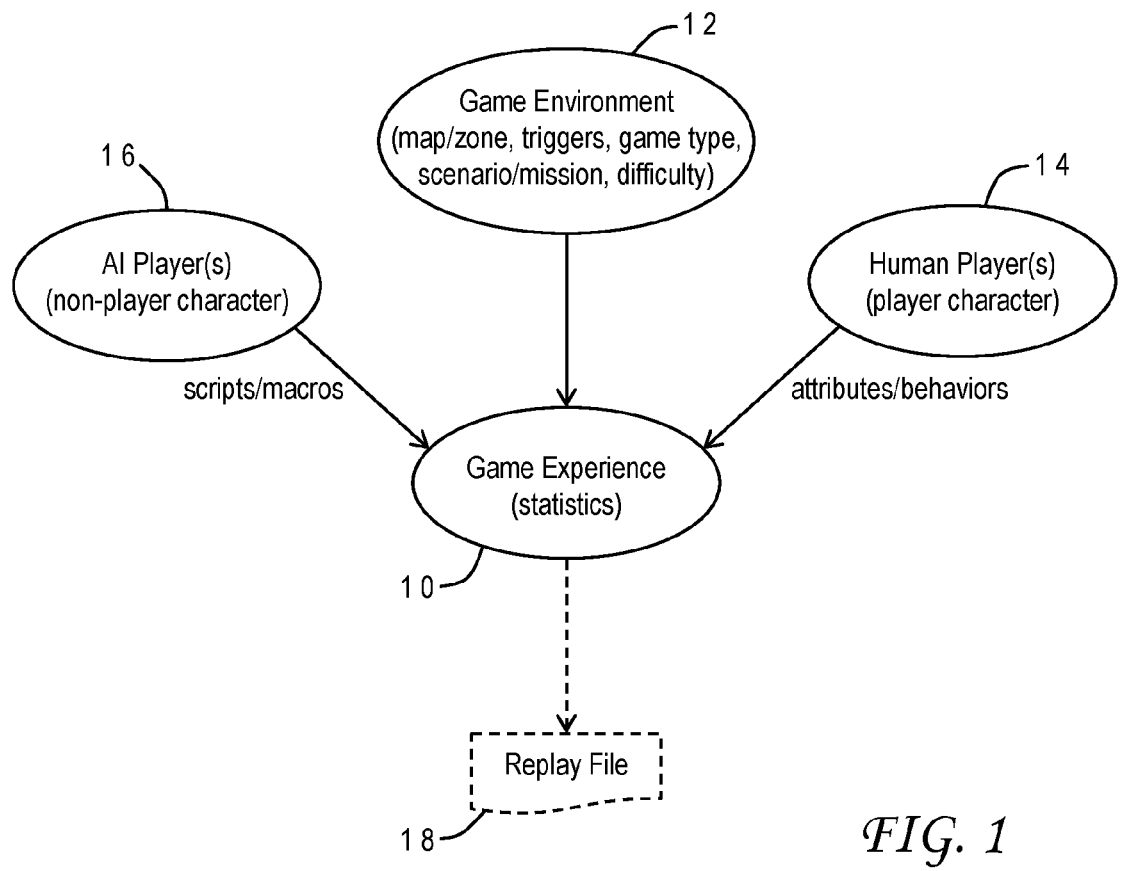
FIG. 1 is a pictorial representation illustrating conventional components of a video game experience.

DESCRIPTION OF THE PREFERRED
EMBODIMENT(S)

Today, a lot of artificial intelligence (AI) in electronic games engage the player by manipulating the environment around it. For example, a computer-generated character (bot) in a first-person shooter multiplayer game would generally move and manipulate items like a human being would, and play with and/or against the human player. However, people who play against the AI can quickly learn to distinguish its patterns. The AI seems relatively "flat"; it does not provide the user with an engaging experience. With the complexities of modern games like first-person-shooters or real-time strategies, it would require a tremendous amount of machine power and time to originally produce the tactics and strategies that a human being would come up with, such as positioning, how to utilize certain items (click rate on a mouse, recoil control of a gun), timing, reactions to adversary movements, etc. Each of these attributes would need to be learned to an optimal level where it can take on human adversaries, but human styles/strategies/tactics change all the time, and these behaviors greatly depend on the particular setting (map/zone).

One of the biggest reasons why it does not create an immersive feel (i.e., fooling the user into believing that they are playing with/against intelligent players) is that the AI does not understand the current status of "meta-game". Meta-game largely describes the style/strategy/tactics of how people play the game. Meta-game can be defined by certain data including human player behavior and/or attributes that are generated by the players interacting with the game world, as described further herein. Meta-game profiles can be different between players, player associations (clans or guilds), regions (North America, Europe, Asia), environment (maps) or game type (free-for-all, capture-the-flag, deathmatch, etc.). Each brand of meta-game has its own advantages and challenges which people figure out and exploit or discard with time.

Unfortunately, current game AI logic cannot capture meta-game. Most AI scripts for video games get their guidance solely from preprogrammed behaviors by designers of the game. The AI does not integrate or differentiate its behavior between the current status of meta-game created by human players and what the AI's avatar is capable of in the game. It would, therefore, be desirable to devise a way to augment existing game AIs which could allow an AI entity to play either with or against a human player using relevant meta-game, not only to improve the AI's performance but also to generally give more of a "look and feel" of a human player. The present invention achieves this objective by providing a system and method for any multiplayer games, to automatically schedule extraction of game environment data and meta-game data based on actual human play during a game session, and extract certain insights to be reused later against a human player via a bot or AI avatar. Human players (or an archetype of the human player extracted from various games) become the champions for the AI/bot to mimic. The invention also allows for a status report at the end of a game providing information on how the player did in meta-game terms of combating the deployed AIs.

Figure 2:
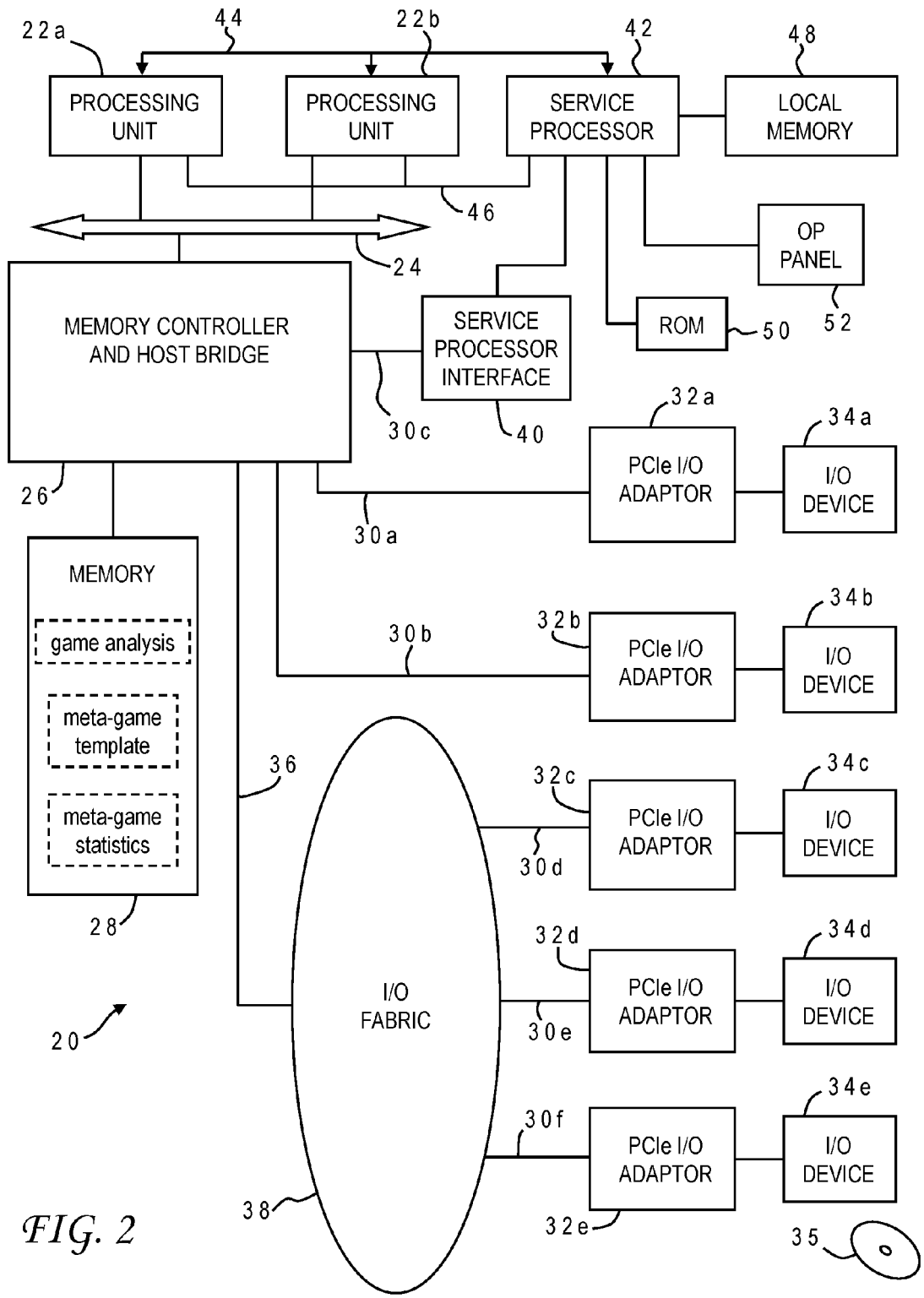
FIG. 2 is a block diagram of a computer system programmed to carry out game analysis and meta-game template generation in accordance with one implementation of the present invention.

With reference now to the figures, and in particular with reference to FIG. 2, there is depicted one embodiment 20 of a computer system in which the present invention may be implemented to carry out various processes associated with meta-game. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 28 has loaded therein one or more applications in accordance with the present invention which may perform various functions such as game analysis, meta-game template generation, or meta-game statistics generation.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32*c*, 32*d*, 32*e* which in turn support more I/O devices 34*c*, 34*d*, 34*e*. The I/O devices may include, without limitation, a keyboard, a graphical pointing device (mouse), a microphone, a display device, speakers, a permanent storage device (hard disk drive) or an array of such storage devices, an optical disk drive which receives an optical disk 35 (one example of a computer readable storage medium) such as a CD or DVD, and a network card. Each PCIe adaptor provides an interface between the PCI link and the respective I/O device. MC/HB 26 provides a low latency path through which processors 22*a*, 22*b* may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30*c* connects MC/HB 26 to a service processor interface 40 to allow communications between I/O device 34*a* and a service processor 42. Service processor 42 is connected to processors 22*a*, 22*b* via a JTAG interface 44, and uses an attention line 46 which interrupts the operation of processors 22*a*, 22*b*. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22*a*, 22*b* and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22*a*, 22*b* for execution of the program code, e.g., an operating system (OS) which is used to launch applications and in particular the meta-game applications of the present invention, results of which may be stored in a hard disk drive of the system (an I/O device 34). While host processors 22*a*, 22*b* are executing program code, service processor 42 may enter a mode of monitoring and reporting any operating parameters or errors, such as the cooling fan speed and operation, thermal sensors, power supply regulators, and recoverable and non-recoverable errors reported by any of processors 22*a*, 22*b*, memory 28, and MC/HB 26. Service processor 42 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for meta-game processes that uses novel analysis techniques to derive an AI template for gameplay. Accordingly, a program embodying the invention may include conventional aspects of various gaming tools, and these details will become apparent to those skilled in the art upon reference to this disclosure.

Figure 3:
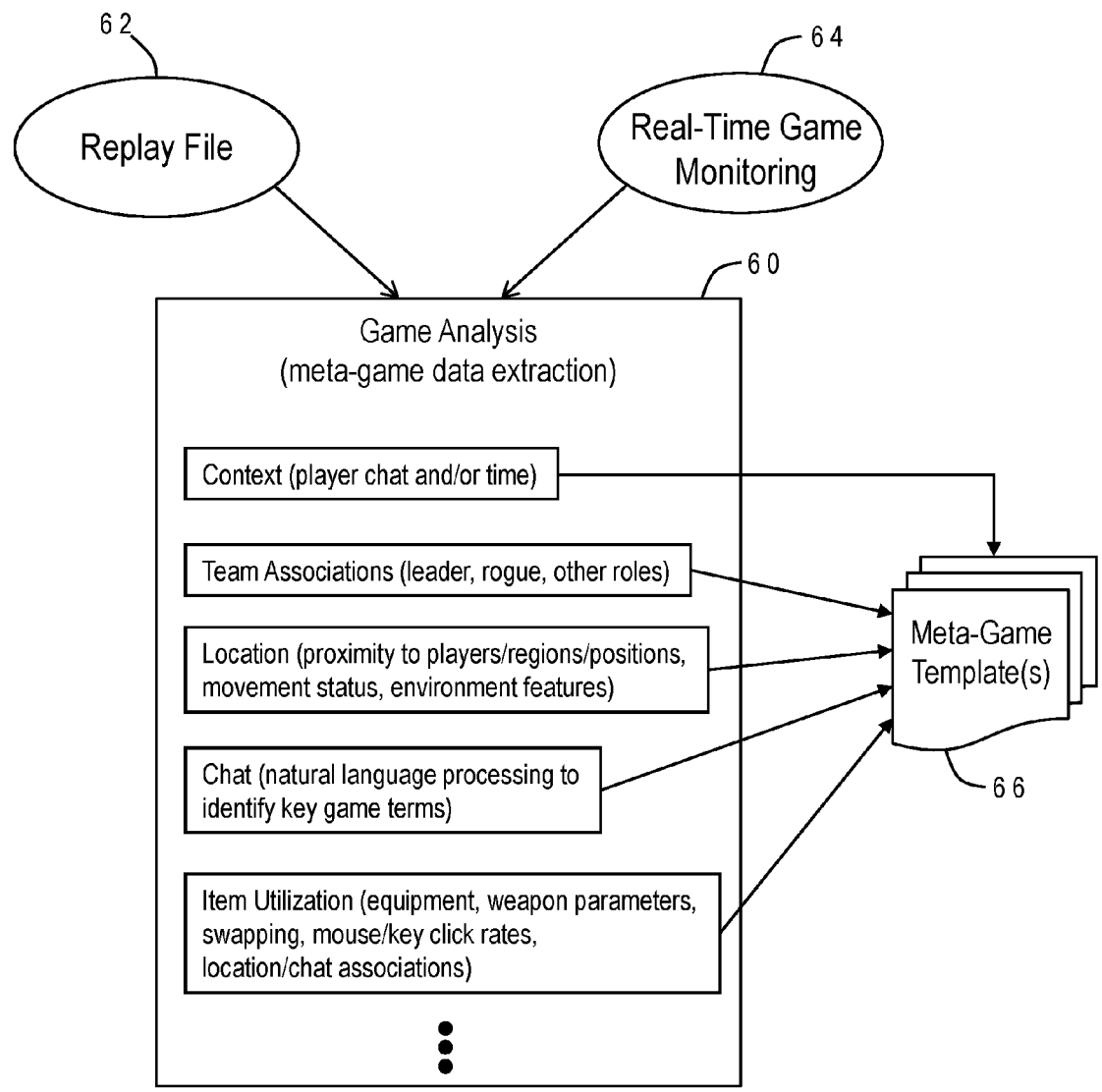
FIG. 3 is a block diagram of game analysis logic that may be carried out by the computer system of FIG. 2 in accordance with one implementation of the present invention.

Referring now to FIG. 3, there is depicted one implementation for the game analysis 60 which computer system 10 may carry out in order to extract meta-game data from an actual played game. Game analysis 60 can receive game information from a conventional replay file 62 or from an ongoing game via real-time game monitoring 64. Most online games are provided by a remote computer system such as a server. The hardware for a server might be a single computer system, but often a single "server" is actually composed of multiple computers, e.g., multiple server drawers in a rack with each server drawer providing various processing functions. The server that is responsible for providing content in a particular game can also operate as the platform for game analysis 60.

Game analysis 60 can extract data from games relating to different meta-game categories. In the illustrative embodiment, game analysis 60 extracts meta-game data relating to context, team associations, location, game chat, and item utilization. While FIG. 3 shows only these five categories for meta-game data, those skilled in the art will appreciate that other categories may be extracted as well. Meta-game data generally pertains to player behavior, but might also be considered to include player attributes, such as the particular gear that is equipped by a player. A weapon equipped by the player is more part of the game environment itself, but the way the player uses the weapon is meta-game, e.g., how they burst fire a specific weapon to reduce recoil, or something unusual such as throwing their primary weapon when a enemy approaches so when the enemy charges, the first salvo of bullets hit the gun being dropped rather than hitting the player, thus acting as impromptu armor.

Context can be derived from a variety of meta-game sources but is preferably based on player chat and/or time. For example, different contexts may apply for early-game, mid-game, and end-game. However, player chat can help refine this analysis. If all the players in a particular game were novices and played the game slowly, it may have passed the 15 minute mark (which is past mid-game for "pro" gamers), but the novices may still be in the early game. Player chat can be used for further context classifications, e.g., pre-planning, reactive, reflective, offensive, defensive, etc. For example, pre-planning can be used to see who will be the leaders of the plan, supporters of the plan, and the rogues. The first person who comes up with a plan (usually with game-relevant data, such as location, types of items/weapons, etc.) and the others either usually agree upon that, or come up with a new plan (which also mentions game-relevant data as well). The supporters of a plan can be seen following the leaders by tracking their game-relevant data or with verbal agreement shortly after the plan proposal. The rogues either go off on their own, which at that point can be considered as "random" data or verbally disagree in the text/voice chat. Reactionary planning usually happens a couple of seconds after the players start playing and they encounter their opponents. Upon witnessing their opponent's actions, they either stick to the primary plan (stay within the same location, etc.) or diverge (go to a different location to accomplish their objective). Examples of reactionary planning in a first person shooter can include picking up a different type of weapon because of enemy proximity, distancing from an enemy, moving towards an enemy, or just staying in a particular location to wait for the enemy. Reflected planning happens after a team either wins or loses a match, can start the pre-planning stages again.

Team associations can include identifying certain roles that players have assumed, such as a leadership role, or a player going "rogue", i.e., not staying with the rest of the players on the team but instead pursuing alternative goals. Other roles may be identified, such as a player whose primary purpose in a battle is to provide some support function such as healing (medic) or suppressive fire as opposed to front-line combat. Team associations may also include player groups such as clans/guilds, or references to geographic regions. Other team information can relate to number of players on a team (or number alive, or a ratio of live teammates on one team versus an opposing team), or to health scores (hit points) of the players.

There can be considerable meta-game data relating to location. A player's proximity to other players on her team, or to regions of the map, or to specific positions (e.g., waypoints) can be recorded. The player's movement status can vary, for example, running, walking, crouching, or motionless for an extended period of time. There may also be game environment features associated with player location, such as what kind of material they are standing on (concrete, dirt, on top of a vehicle, etc.).

Game chat can be used for more than determining game context. Natural language processing can be used to identify key game terms and differentiate the vocabulary used by the gamers (within a specific game) to extract strategies, tactics, and gameplay behavior, for example, detecting teamwork regarding a particular location. Identification of key game terms may optionally be augmented by human input. Player chat can be associated with any other ongoing meta-game data. Game chat is discussed further below in conjunction with FIG. 4.

Item utilization can have several facets. This category not only includes what specific items are equipped, but exactly how they are used. For example, weapons might have certain types or amounts of ammunition, might be equippable in more than one slot (e.g., primary weapon, secondary weapon), might be swapped out with other weapons during combat, and might have other attributes, such as possibly being used with a silencer, or having a particular radius of effect (area attack). Equipment may be used by clicking a mouse button or hitting a key on the keyboard and these mouse/key click rates can be recorded. Item utilization can also be correlated with particular locations, chat, etc. For example, weapon use while a player says "I'm reloading, cover me!" combined with location information, e.g., retreating. The analysis may allow for weapon types and not just specific weapons, e.g., melee vs. ranged. In this manner, the template can allow more flexibility in deployment by providing alternative actions, for example, if a particular weapon is not available, another similar weapon can be chosen.

While these examples of meta-game data are fairly comprehensive, this list is not intended to be exhaustive and indeed cannot be, since game designers will provide additional parameters beyond these in newly developed games. Game analysis 60 can be used to collect meta-game data from many separate games (e.g., hundreds or thousands), and then correlate this data with successful game play to identify which meta-game data is deemed most beneficial for a given context. This meta-game data is then consolidated into one or more meta-game templates 66 for later use by the AI.

Figure 4:
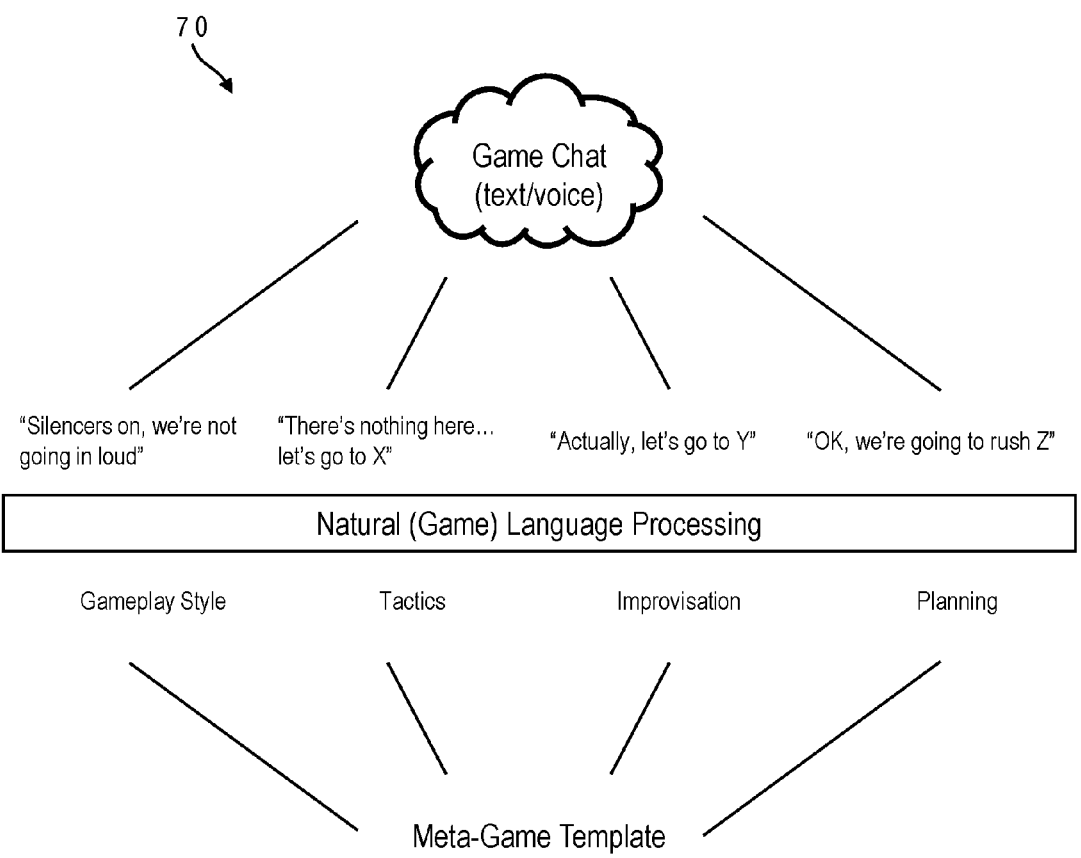
FIG. 4 is a pictorial representation of meta-game communications analysis using natural language processing to determine a chat context of human players in accordance with one implementation of the present invention.

FIG. 4 illustrates further how game chat can be used to provide parametric values for a meta-game template. The present invention can utilize existing technologies in this endeavor, such as speech-to-text processing (voice recognition) to make in-game voice chat intelligible to game analysis 60. In addition to voice chat, text that is typed by players can also be monitored. Natural language processing (NLP) can then be used to extract the nature of player discussions. NLP is a known science which enables computers to derive meaning from human or natural language input. In some NLP methodologies, a text annotator program searches text in documents and analyzes it relative to a defined set of tags. The front-end NLP can include identification of a lexical answer type and a focus, and creation of a common analysis structure. Lexical answer type, focus and common analysis structure are known features of the prior art. Those skilled in the art will appreciate that the present invention may be applied to other analysis techniques which can parse natural language chat which includes gaming terminology. The lexicography of the NLP used is preferably tailored according to the particular game being played. For example, game map location names may be referred to by human players using popular codenames, and this special vocabulary can be added to the NLP resource dictionary.

FIG. 4 gives four examples of how chat can be integrated into a meta-game template. In the first example, a player says "Silencers on, we're not going in loud". The NLP analysis 70 can classify this statement as relating to gameplay style (quiet vs. loud). This gameplay style can then be reflected in a template, whereby an AI avatar adopts the quiet approach for a particular context. In a second example, a player types "There's nothing here . . . , let's go to X". NLP of this statement can result in a tactical observation, i.e., if no enemies or interactive objects are found at location 1, then the AI avatar/team will move to location 2. In a third example, this same player subsequently says "Actually, let's go to Y". NLP can recognize this statement as an improvisation which can be inserted into the template in such a manner that the AI avatar can seem to randomly change course, mimicking human behavior. In the final example, a player says "OK, we're going to rush Z". The NLP can interpret this statement as a planning strategy, understanding that an attack at location Z should commence forthwith, without any extended preparation.

Figure 5:
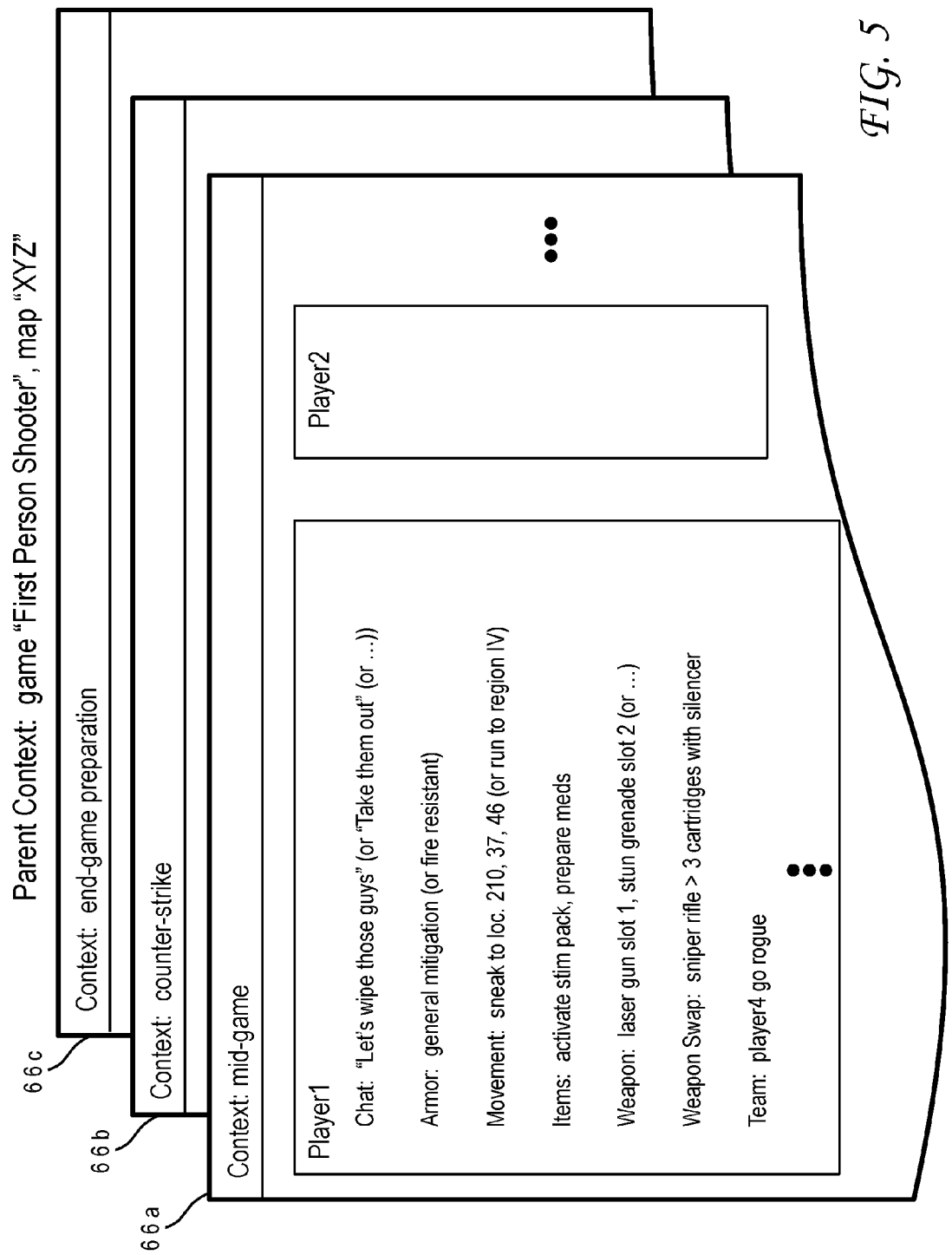
FIG. 5 is a block diagram of a series of meta-game templates constructed in accordance with one implementation of the present invention.

FIG. 5 shows exemplary meta-game templates 66 that might be constructed via game analysis 60 in accordance with some implementations of the present invention. The parent context or setting for these templates is a specific map for a specific game. In this example, the game is a first-person shooter with a map "XYZ". Three different templates 66a, 66b, 66c are provided for three different contexts. Any of these three templates could be used during a single game depending upon the context detected. Template 66a is for mid-game play; template 66b is for a counter-strike strategy ("counter-strike" not referring to the game of the same name, but rather to the original meaning of launching an offensive attack at one location in response to being attacked at a different location); template 66c is for end-game preparation, i.e., not actually used during end game but when end game is approaching. In these examples, the context for template 66a is purely time-based, the context for template 66b is purely chat based, and the context for template 66c is based on both chat and time.

FIG. 5 provides details for the AI players in the mid-game context template 66a. AI player 1 (who may for example be designated as the AI team leader), will implement this template beginning with a chat statement "Let's wipe those guys" or "Take them out". AI player 1 will then carry out various commands indicated by the template. First, AI player 1 can equip armor of the type that generally increases physical mitigation, e.g., a bullet-proof vest; if such armor is not available, the AI player 1 will try to equip fire-resistant armor. AI player 1 will contemporaneously begin sneaking to a specific point ("location 210, 37, 46") on the map; if the AI player is detected or otherwise unable to sneak, it will instead run to an area of the map known by a particular designation ("region IV"). As AI player 1 moves, it can active a "stim pack" item to increase its offensive capabilities, and prepare a secondary item (medications) for use. AI player 1 will equip a laser gun in its right hand (slot 1) and a stun grenade in its left hand (slot 2). If these weapons are not available, alternative weapons can be indicated. AI player 1 may also have a secondary weapon ready to swap, in this case a sniper rifle that should have at least three rounds of ammo and be equipped with a silencer. Team meta-game may indicate that AI player 1 should wait for other players on its team if they are not nearby (except for rogue players).

Template 66a can include control of (actions/commands for) other AI players on the same or a different team. For example, other AI players may be instructed to follow the AI team leader, but one AI player may be instructed to "go rogue", i.e., to move away from the rest of its team and establish a secondary tactical goal. Using these strategies reflected in the templates, the AI players are not only better prepared to succeed against the human players, but also are more likely to confuse human players as to whether the AI player is actually computer-controlled.

Figure 6:
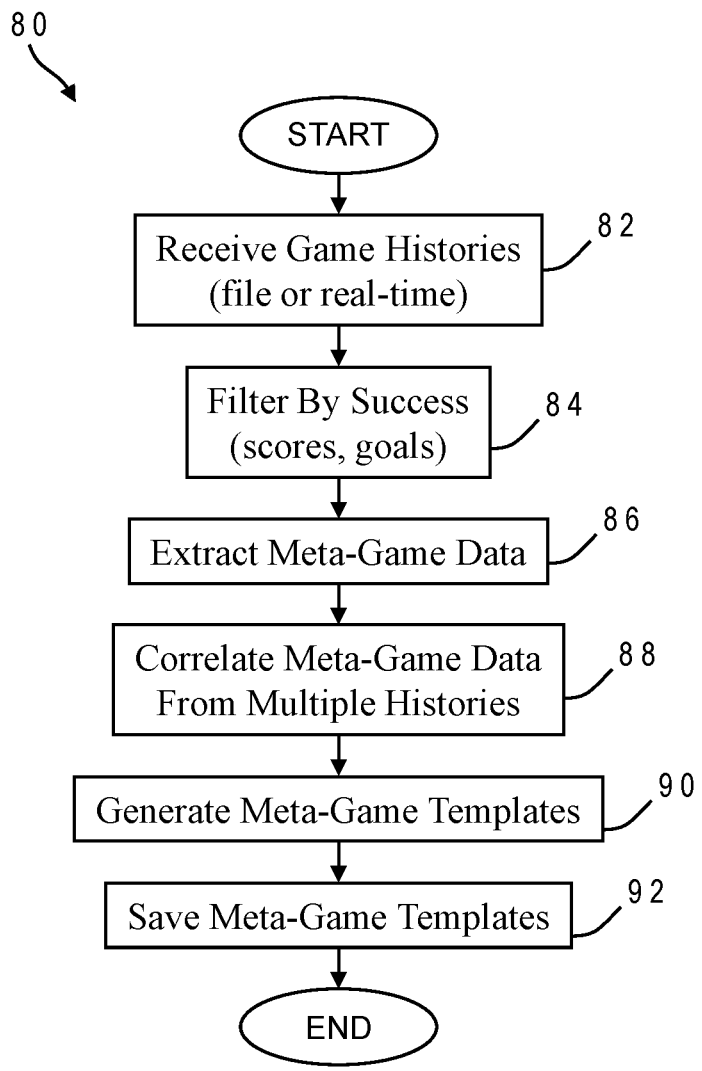
FIG. 6 is a chart illustrating the logical flow for a meta-game template generation process in accordance with one implementation of the present invention.

The present invention may be further understood with reference to the chart of FIG. 6 which illustrates the logical flow for a meta-game template generation process 80. Process 80 begins when a computing device such as computer system 10 receives game histories either in real-time or via replay files (82). The games can initially be filtered by success (84). This filtering may be based on a variety of criteria, such as scores (player or team), or particular goals of the map involved such as controlling certain areas or acquiring certain resources. The filtering criteria may be adjusted to ensure an adequate sampling of the games. For example, the filtering may mandate using the top 10% of successful games, e.g., games in which a player's individual score is in the top 10 percentile of scores. More than one filter criteria may be applied, so a game that might not be considered successful according to one criterion might still be included in the meta-game analysis so long as that game still is considered successful according to another criterion. Meta-game data is then extracted from the human behaviors in the games, for example as indicated in FIG. 3 (86). Use of multiple successful games allows the game analysis to statistically correlate particular meta-game data with desirable styles, strategies, and tactics (88). In other words, if one particular meta-game is present for a particular context in an overwhelming number of successful games, that meta-game is designated as a primary action/command in the template for the AI. The exact statistical parameters defining a positive correlation are up to the designer of the game analysis logic. The computer system can take the successful meta-game and use them to generate the templates (90), which are then saved for later deployment (92).

Meta-game templates may be updated or replaced over time by including more recent game histories and/or excluding older game histories from the analysis. This continuous updating of the templates helps keep the AI constructs relevant to current gameplay.

Figure 7:
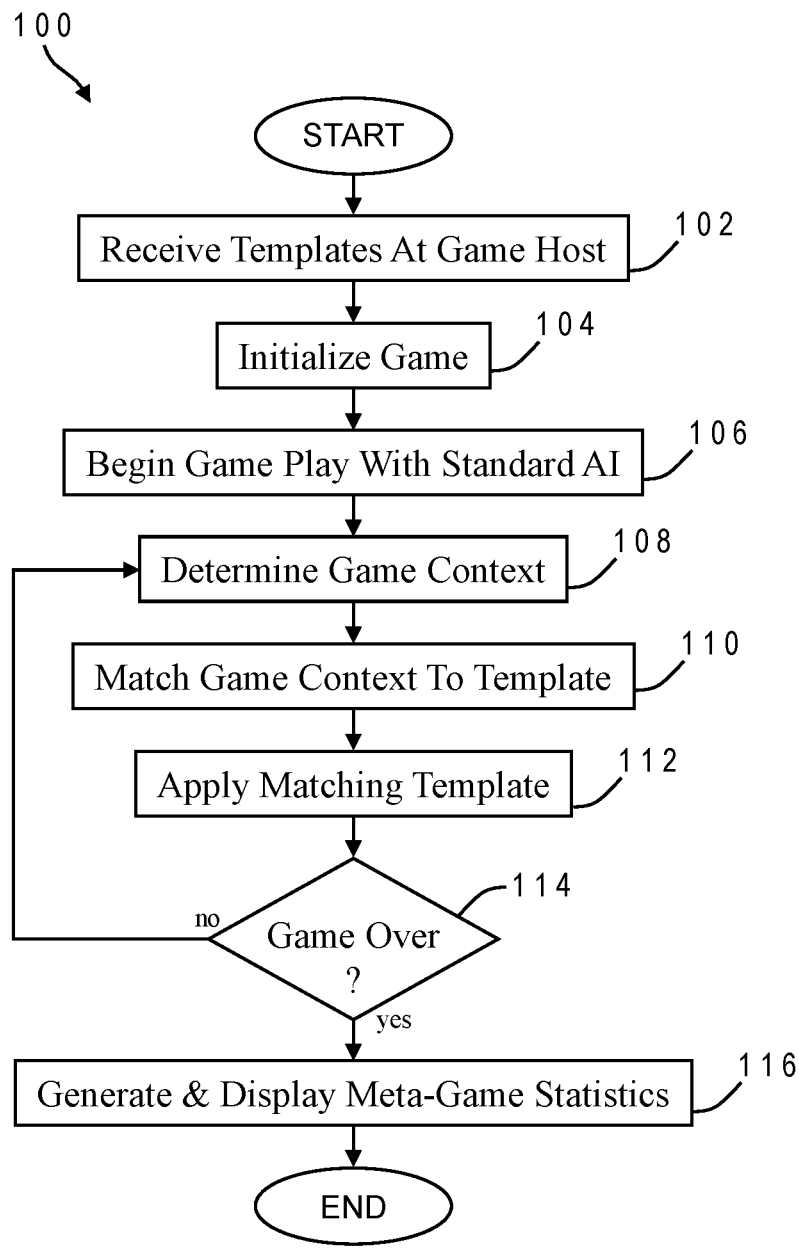
FIG. 7 is a chart illustrating the logical flow for utilizing a meta-game template in a video game in accordance with one implementation of the present invention.

FIG. 7 illustrates how the templates may subsequently be used in accordance with the present invention. This process 100 begins with the computer system (e.g., server) which is acting as game host receiving the templates for the particular game/map (102). The game host initializes the game (104) and begins play using its standard AI routines (106). The game host then enters into a monitoring process to determine the current game context (108). As explained above, the context can be based on various factors but it most preferably based on a combination of player chat and timing. The current game context is then matched to a particular template having the same or similar context (110), and that matching template is applied to exercise control over the AI entities (112). The AI templates can be used for play against or in cooperation with human players. The process returns iteratively to box 108 to continue to apply different templates based on changing contexts, until the game is over (114).

Upon ending the game, the game host can present meta-game statistics in a report to the users (116). These meta-game statistics are quite different from the inert statistics provided by conventional games. The meta-game statistics inform the user what to improve or work on in order to defeat the AI's tactics, and can also help the user prepare for play against human players. For example, a meta-game statistics screen might include a first heading of "Tactics most vulnerable to:" with two entries of "far range weapons", and "enemies closing fast", and a second heading of "Advice:" with an entry "stay near teammates".

The present invention accordingly possesses many advantages over conventional game AIs. It is easily adapted to any game and any AI control format. Leveraging the tactics and strategies used by human beings results in a superior AI challenge as compared to new actions which reinforced learning would most likely produce. By deconstructing and analyzing statistics of the strategies used in a game, and combining this with the existing reactionary AI in the game, the augmented AI is able to deploy tactics in a time-relevant manner. The invention not only makes the AI more successful per the game's goals, but additionally makes it more human-like so as to possibly even confuse human players, thus providing a more immersive experience.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of a first-person shooter game, it is equally application to other game categories such as real-time strategy or role playing games. It is therefore contemplated that such modifications can be made without departing from the spirit or scope of the present invention as defined in the appended claims.

What is claimed is:

1. A method of developing an automated play strategy for an electronic game comprising:

receiving a plurality of game histories for previously played games wherein each game history includes game environment data and meta-game data relating to behavior of one or more human players, by executing first instructions in a computer system;

analyzing the game histories to associate specific meta-game data with successful play wherein said analyzing includes extracting game chat from at least one of the one or more human players and establishing a context based on the game chat using natural language processing, by executing second instructions in the computer system;

creating a meta-game template for automated play based on the specific meta-game data, by executing third instructions in the computer system; and applying the meta-game template in a subsequent game, wherein said applying includes identifying a current context of the subsequent game, matching the current context to the established context, and controlling an artificial intelligence entity within the subsequent game in accordance with the meta-game template.

2. The method of claim 1 wherein said analyzing includes filtering the game histories according to success and determining that the specific meta-game data is statistically correlated with successful games.

3. The method of claim 1 wherein the meta-game data at least includes team associations, location information relating to at least one of the one or more human players, game chat, and item utilization by at least one of the one or more human players.

4. The method of claim 1 wherein the specific meta-game data is associated with a particular time period of the electronic game.

5. The method of claim 1 further comprising presenting meta-game statistics from the subsequent game to a human player of the subsequent game after conclusion of the subsequent game.

6. A computer system comprising:
   one or more processors which process program instructions;
   a memory device connected to said one or more processors; and
   program instructions residing in said memory device for developing an automated play strategy for an electronic game by receiving a plurality of game histories for previously played games wherein each game history includes game environment data and meta-game data relating to behavior of one or more human players, analyzing the game histories to associate specific meta-game data with successful play wherein the analyzing includes extracting game chat from at least one of the one or more human players and establishing a context based on the game chat using natural language processing, creating a meta-game template for automated play based on the specific meta-game data, and applying the meta-game template in a subsequent game, including identifying a current context of the subsequent game, matching the current context to the established context, and controlling an artificial intelligence entity within the subsequent game in accordance with the meta-game template.

7. The computer system of claim 6 wherein the analyzing includes filtering the game histories according to success and determining that the specific meta-game data is statistically correlated with successful games.

8. The computer system of claim 6 wherein the meta-game data at least includes team associations, location information relating to at least one of the one or more human players, game chat, and item utilization by at least one of the one or more human players.

9. The computer system of claim 6 wherein the specific meta-game data is associated with a particular time period of the electronic game.

10. The computer system of claim 6 wherein said program instructions further present meta-game statistics from the subsequent game to a human player of the subsequent game after conclusion of the subsequent game.

11. A computer program product comprising:
    a computer readable storage medium; and
    program instructions residing in said storage medium for developing an automated play strategy for an electronic game by receiving a plurality of game histories for previously played games wherein each game history includes game environment data and meta-game data relating to behavior of one or more human players, analyzing the game histories to associate specific meta-game data with successful play wherein the analyzing includes extracting game chat from at least one of the one or more human players and establishing a context based on the game chat using natural language processing, creating a meta-game template for automated play based on the specific meta-game data, and applying the meta-game template in a subsequent game, including identifying a current context of the subsequent game, matching the current context to the established context, and controlling an artificial intelligence entity within the subsequent game in accordance with the meta-game template.

12. The computer program product of claim 11 wherein the analyzing includes filtering the game histories according to success and determining that the specific meta-game data is statistically correlated with successful games.

13. The computer program product of claim 11 wherein the meta-game data at least includes team associations, location information relating to at least one of the one or more human players, game chat, and item utilization by at least one of the one or more human players.

14. The computer program product of claim 11 wherein the specific meta-game data is associated with a particular time period of the electronic game.

* * * * *